United States Patent Office 2,829,072
Patented Apr. 1, 1958

2,829,072

PROCESS FOR THE TREATMENT OF TEXTILE MATERIALS WITH EPOXY RESINS AND FOR CURING THE SAME

William B. Thomas, Lewiston, Maine, assignor to Bates Manufacturing Company, a corporation of Maine No Drawing. Application May 19, 1954
Serial No. 430,971

4 Claims. (Cl. 117—139.4)

The present invention relates to a method of improving the crease resistance, as well as the dimensional stability, rate of drying and other characteristics, of a textile material by impregnating it with an epoxy resin precondensate and curing the resin precondensate on and within the fibers, as well as to a method of curing epoxy resin precondensates to form high molecular weight polymers thereof.

I have made the surprising discovery that epoxy resin precondensates, a term used herein to refer to soluble and dispersible polyepoxides generally and to water-soluble glycidyl polyethers of glycerol in particular, can be polymerized or cured advantageously in the presence of catalytic amounts of a peroxyhalogenide, preferably a perchlorate, of a metal other than an alkali metal and an alkaline earth metal as defined in "Chambers's Technical Dictionary," Revised Edition, 1948. I have also made the surprising discovery that the use of these metal peroxyhalogenides as catalysts for curing or polymerizing the epoxy resin precondensates is effective under conditions applicable to textile materials, particularly cellulosic textile fabrics, a term used herein to refer to fabrics, preferably woven, consisting partly or wholly of cellulosic material, and that such fabrics, when impregnated with epoxy resin precondensate and cured by heat treatment in the presence of a metal peroxyhalogenide, have superior crease resistance as well as increased dimensional stability, drying rate and other properties desirable in textiles, such as draping qualities, good hand and the like.

The epoxy resin precondensates suitable in the method of the invention are generally prepared by reacting an epihalohydrin with an alcohol, preferably polyhydric, as described for example in Patents 2,538,072 and 2,581,464 granted to John D. Zech. The resulting reaction product is one, or a mixture of products, essentially containing an average of at least one epoxide group per molecule, at least one ether group per molecule, and preferably also at least one halogen atom per molecule. The resin precondensates preferably utilized in accordance with the invention are the glycidyl ethers of polyhydric alcohols having average molecular weights ranging from less than 300 up to about 900 and containing an average of between about two and about three epoxide groups per molecule. Halogen-containing glycidyl polyethers of glycerol, such as those described in Example I of the aforementioned patents to Zech as being obtained by reacting three mols epichlorhydrin with one mol glycerol and dehydrohalogenating the polychlorhydrin ether so formed, are specifically included among the preferred epoxy resin precondensates of the present invention.

The epoxy group or groups in the resin precondensate react readily with compounds, such as acids, alcohols, amines, amides, mercaptans and phenols, that contain active hydrogen atoms. While the present invention is not to be limited by any theory expressed herein, it is believed that the polymerization or curing of the epoxy resin precondensate involves inter- and intramolecular reactions in which the epoxy resin groups play a prominent part in accordance with principles well understood by those skilled in the art. It is believed possible also that when epoxy resin precondensates are polymerized or cured on or in a cellulosic material, the epoxy groups may react with hydroxyl groups of the cellulose. Thus, it is believed possible that both a resin formation and a reaction with cellulose can occur in the textile treating method of the invention.

The latent catalytic activity of metallic peroxyhalogenides, and particularly of the perchlorates, in which the cation is neither an alkali metal nor an alkaline earth metal, is surprising. From the point of view generally of polymerizing the epoxy resin precondensates, the catalytic activity of the peroxyhalogenides, e. g., the perchlorates of magnesium, aluminum, and zinc, is surprising because the corresponding halides, magnesium chloride, aluminum chloride and zinc chloride, which are widely employed as catalysts for organic reactions and might be expected to serve as catalysts for the polymerization of epoxy resin precondensates, are not effective. From the point of view particularly of polymerizing or curing the epoxy resin precondensates on or in cellulosic textile fabrics, the utility of the metallic peroxyhalogenides as catalysts is surprising because of the known strong oxidizing power of these compounds and the consequent expectation that a treatment of cellulosic fibers would result in excessive damage and unacceptable loss of strength to the fibers.

Peroxyhalogenides of alkali metals and of alkaline earth metals are excluded as catalysts for the purposes of the invention because a representative number thereof have been tested and found inactive. Those tested include lithium, calcium and barium perchlorates. Metallic perchlorates such as those of magnesium, aluminum, cadmium, copper, manganese, zinc, silver, lead and cobalt become active as catalysts upon being heated to an elevated temperature. Some perchlorates, such as aluminum perchlorate, require less severe heating conditions than others.

While the exact mechanism of the catalysis of epoxy resin polymerization by peroxyhalogenides is unknown, it is believed that perhaps the catalytically active perchlorates, for example, decompose to yield perchloric acid according to the following reaction, in which magnesium perchlorate is used by way of illustration:

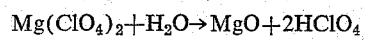

$$Mg(ClO_4)_2 + H_2O \rightarrow MgO + 2HClO_4$$

and that the liberated perchloric acid then serves as a catalyst. Catalytically inactive peroxyhalogenides on the other hand may either be stable under the conditions employed in accordance with this invention or may decompose according to the reaction, using sodium perchlorate by way of illustration:

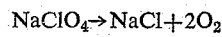

$$NaClO_4 \rightarrow NaCl + 2O_2$$

Evidence for these two types of thermal decomposition is reported in an article by Marvin and Woolaver, Industrial and Engineering Chemistry, Analytical Edition, vol. 17, page 474 (1945).

In accordance with one embodiment of the method of the invention, a textile fabric is impregnated with an aqueous solution or dispersion of the epoxy resin precondensate, preferably by padding onto the fabric. The solution or dispersion may also contain wetting agents, emulsifying agents, softeners and other textile auxiliaries and, in the preferred method, the latent catalyst is added to the resin precondensate solution or dispersion. In order to avoid hydrolysis of the epoxy groups, the aqueous solutions or dispersions of epoxy resin precondensates should be maintained at a pH within a range of from about 3 to about 9.5. Such hydrolysis should be avoided to minimize interference with subsequent curing or polymerization. One of the advantages of the present method is that solutions and dispersions of epoxy resin precondensates containing the latent catalyst can readily be kept within the range of pH referred to above.

After the fabric is impregnated with the solution or dispersion, the fabric is dried. If a catalyst such as aluminum perchlorate, which becomes active at a temperature within the range reached on the drying frame, is used, the resin precondensate will become polymerized on and in the fabric in the drying operation and subsequent curing is unnecessary. On the other hand, it is often desirable to separate the drying and curing operations. In this event, a catalyst such as magnesium perchlorate may be employed without encountering virtually any polymerization during the drying operation at the ambient temperatures usually employed within the textile tenter frame. When desired, the resin precondensate may then be cured in a curing oven in which an ambient temperature sufficient to activate the catalyst is reached.

While the catalysts of the invention are, because of their latent activity, most advantageously added to the epoxy resin precondensate solution or dispersion before it is applied to a textile material, it is to be understood that it is within the scope of the invention to add, by spraying or the like, the catalyst after the application of the precondensate.

Following the curing operation, the fabric may be scoured and subjected to other conventional finishing operations. The fabric may also be finished, and in fact converted into a garment, before the precondensate is applied and cured.

The treatment of textile fabrics, particularly woven cellulosic textile fabrics, in accordance with the method of the invention imparts to the fabric rather remarkable and long-lasting improvement in crease resistance as well as in dimensional stability, i. e., against shrinking and stretching, and makes it possible to dry the treated fabric more rapidly than a similar non-treated fabric. This advantage is obtained with minimum reduction in strength while maintaining good hand and draping qualities.

The following examples are intended to illustrate, without limiting the scope of the invention, the advantages and utility of various embodiments of the invention. In these examples a plain weave combed cotton print cloth of greige construction 78 x 84 which had been desized, bleached and mercerized was employed. The tensile strength (grab break) of the fabric was evaluated and its crease resistance was determined in conventional manner with a Monsanto wrinkle recovery tester, a large recovery angle indicating good crease resistance. For purposes of comparison with the treated samples of cotton fabric described in the examples, the strength and crease resistance of the cotton fabric before treatment are given immediately below:

|  | Warp | Filling |
| --- | --- | --- |
| Tensile Strength_____pounds__ | 59.6 | 64.1 |
| Crease Resistance_____degrees__ | 71.2 | 84.4 |

*Example I*

An aqueous dispersion was prepared from the following materials:

| | Grams |
| --- | --- |
| "Epon 562"_____ | 200.0 |
| Softening agent_____ | 67.0 |
| Surface active agent_____ | 3.3 |
| 5% solution of polyvinyl alcohol_____ | 186.7 |
| Zinc perchlorate solution_____ | 50.1 |
| Water _____ | 492.9 |
| | 1000.0 |

The "Epon 562" was an epoxy resin precondensate available from the Shell Oil Company and believed to be a glycidyl polyether of glycerol prepared, as described in Example I of Patent 2,581,464, by reacting one mol of glycerol with three mols epichlorhydrin in the presence of an ethylether solution of $BF_3$ and dehydrohalogenating the resulting polychlorohydrin ether with sodium aluminate. The glycidyl polyether of glycerol is believed to contain an average of about 2.2 epoxide groups per molecule and to have an average molecular weight of 324. The softening agent was a paste containing 15% of "Armeen 2 HT," a product obtained from Armour and Company and believed to be a high molecular weight aliphatic secondary amine. The surface active agent was "Lipal 40," obtained from E. F. Drew and Company and believed to be a nonionic polyethylene glycol ester. The polyvinyl alcohol was a high viscosity type, 76 to 79% alcoholized. The zinc perchlorate solution was prepared from 50 grams of 70.7% perchloric acid, 15 grams of zinc oxide and 75 grams of distilled water, the solution being filtered before use.

A piece of the cotton print cloth was padded with the dispersion and a wet pick-up of about 60% was obtained. The cloth was dried 2½ minutes in an oven at 240° F. and then cured for one minute in an oven at 325° F. The cloth was then scoured and air dried.

The treated fabric showed a crease resistance of 128.3° in the warp and 135.5° in the filling. The filling strength was 30 lbs.

*Example II*

A dispersion was prepared from the following materials:

| | Grams |
| --- | --- |
| "Epon 562"_____ | 167 |
| Softening agent_____ | 75 |
| Surface active agent_____ | 3 |
| 5% solution of polyvinyl alcohol_____ | 185 |
| Magnesium perchlorate solution_____ | 15 |
| Water _____ | 555 |
| | 1000 |

The softening agent was a dispersion containing 20% ethylene glycol monostearate, the surface active agent was "Ethofat 60-15," a nonionic surface active agent available from Armour and Company and believed to be produced by reacting fractionated and distilled fatty acids with ethylene oxide. The magnesium perchlorate solution was prepared from 50 grams of 71% perchloric acid, 7.8 grams of magnesium oxide and 82 grams of water, the solution being filtered before use. The "Epon 562" and polyvinyl alcohol corresponded to those used in Example I.

A piece of the cotton print cloth was padded with this dispersion and dried as described in Example I. It was then cured for 2 minutes at 325° F. After scouring and air drying the treated fabric showed crease resistance of 91.0° in the warp and 107.3° in the filling. The filling strength was 45 lbs.

*Example III*

1000 grams of an aqueous solution containing 132 grams of the water-soluble portion of "Epon 562" and 35 grams of the magnesium perchlorate solution described in Example II were used to pad a piece of the cotton print cloth. The wet pick-up was 59.8%. The cloth was dried 2½ minutes at 240° F. and cured 1½ minutes at 350° F. After scouring and drying, the treated fabric showed a crease resistance of 107° in the warp and 132° in the filling and had a filling strength of 39 lbs. and a warp strength of 44 lbs.

*Example IV*

A slurry of manganous carbonate was prepared by adding a solution of 46.1 grams of anhydrous sodium carbonate in 200 ml. of water to 73.5 grams of manganous sulfate monohydrate dissolved in 500 ml. of water. The resulting precipitate was washed thoroughly with water by decantation and then dissolved by adding 103.8 grams of 71.3% perchloric acid. The solution of manganous perchlorate weighed 342 grams after filtering.

A pad solution was prepared from 132 grams of the water-soluble portion of "Epon 562" and 27.3 grams of the manganous perchlorate solution and enough water to make 1000 grams of solution. A piece of the cotton print cloth was padded with this solution with a resultant wet pick-up of 58.9%. The cloth was dried for 2½ minutes at 240° F. and cured for 1½ minutes at 375° F. After scouring and drying, the treated fabric showed a crease resistance of 105° in the warp and 126° in the filling and had a filling strength of 42 lbs. and a warp strength of 44 lbs.

*Example V*

A solution of cadmium perchlorate was prepared by adding 81.8 grams of 71.3% perchloric acid to a slurry of 52 grams of cadmium carbonate in 150 ml. of water. The resulting mixture was filtered, yielding 252 grams of solution.

A solution containing 132 grams of the water-soluble portion of "Epon 562" and 24.7 grams of the cadmium perchlorate solution in enough water to make 1000 grams of solution was used to pad a piece of the cotton print cloth. The wet pick-up was 59.1%. The cloth was dried for 2½ minutes at 240° F. and cured for 1½ minutes at 375° F. After scouring and drying, the treated fabric showed a crease resistance of 93.5° in the warp and 122° in the filling and had a filling strength of 41 lbs. and a warp strength of 48 lbs.

*Example VI*

A solution of cupric perchlorate was prepared by adding 144.7 grams of 71.3% perchloric acid to a slurry of 55 grams of technical cupric hydroxide in 150 ml. of water. The mixture was filtered and the precipitate was washed with a small quantity of water and the washings combined with the filtrate. The total weight of this solution was 365 grams.

A piece of the cotton print cloth was padded in a solution prepared from 132 grams of the water-soluble portion of "Epon 562" and 10 grams of the cupric perchlorate solution in enough water to make a total of 1000 grams. The wet pick-up was 56.3%. The cloth was dried for 2½ minutes at 240° F. and cured 1½ minutes at 325° F. After scouring and drying, the treated fabric showed a crease resistance of 109° in the warp and 130° in the filling and had a filling strength of 32 lbs. and a warp strength of 38 lbs.

*Example VII*

A catalyst solution was prepared by reacting 3.5 grams of aluminum foil with 50 grams of 71% perchloric acid diluted with 182 grams of water. The resulting solution weighed 294.4 grams after filtering.

Enough water was added to a 15 gram portion of the above solution and to 132 grams of the water-soluble portion of "Epon 562" to make 1000 grams of solution. A piece of the cotton print cloth was padded in this solution with a wet pick-up of 57.8%. The cloth was dried 2½ minutes at 240° F. No additional curing operation was necessary. The fabric was scoured and dried after which it was tested. The crease resistance was 103° in the warp and 118° in the filling. The filling strength was 47 lbs.

*Example VIII*

A solution of silver perchlorate was prepared by adding 47 grams of 71.3% perchloric acid to a slurry of 46 grams of silver carbonate in 150 grams of water. The resulting mixture was filtered and the precipitate was washed with a small quantity of water and the washings combined with the filtrate. The total weight of this solution was 288 grams.

A solution containing 132 grams of the water soluble portion of "Epon 562" and 50.7 grams of the silver perchlorate solution in enough water to make 1000 grams of solution was used to pad a piece of the cotton print cloth. The wet pickup was 55.2%. The cloth was dried for 2½ minutes at 240° F. and cured for 1½ minutes at 375° F. After scouring and drying, the treated fabric showed a crease resistance of 86.5° in the warp and 109.0° in the filling and had a filling strength of 42 pounds and a warp strength of 45 pounds.

*Example IX*

A solution of lead perchlorate was prepared by adding 94.0 grams of 71.3% of perchloric acid to a slurry of 89.1 grams of lead carbonate in 175.0 grams of water. The resulting mixture was filtered, yielding 345 grams of solution.

A solution containing 132 grams of the water soluble portion of "Epon 562" and 30.4 grams of the lead perchlorate solution in enough water to make 1000 grams of solution was used to pad a piece of the cotton print cloth. The wet pickup was 53.6%. The cloth was dried for 2½ minutes at 240° F. and cured for 1½ minutes at 350° F. After scouring and drying, the treated fabric showed a crease resistance of 94.8° in the warp and 116.0° in the filling and had a filling strength of 45 pounds and a warp strength of 48 pounds.

*Example X*

A solution of cobaltous perchlorate was prepared by adding 94.0 grams of 71.3% perchloric acid to a slurry of 39.7 grams of cobaltous carbonate in 175 grams of water. The resulting mixture was filtered and the precipitate was washed with a small quantity of water and the washings combined with the filtrate. The total weight of the solution was 342 grams.

A piece of cotton print cloth was padded in a solution prepared from 132 grams of the water soluble portion of "Epon 562" and 30.2 grams of the cobaltous perchlorate solution in enough water to make a total of 1000 grams. The wet pickup was 54.6%. The cloth was dried for 2½ minutes at 240° F. and cured in 1½ minutes at 375° F. After scouring and drying, the treated fabric showed a crease resistance of 94.3° in the warp and 121.5° in the filling and had a filling strength of 42 pounds and a warp strength of 41 pounds.

The foregoing examples are illustrative of the variety of catalytically active metallic perchlorates and of the remarkable increases in crease resistance obtained, with minimum sacrifice of tensile strength, by curing in situ an epoxy resin precondensate on and in the fibers of a woven high count cellulosic textile fabric.

It is to be understood that numerous changes and modifications will readily occur to those skilled in the art upon reading this description. All such changes and modifications are intended to be included within the scope of the invention as defined in the appended claims.

I claim:

1. The process for improving the crease resistance of a textile fabric comprising impregnating the fabric with an aqueous solution containing a saturated polyepoxide which is a polyglycide ether of a polyhydric alcohol and a catalytic amount of a perchlorate of a metal selected from the group consisting of magnesium, aluminum, cadmium, copper, manganese, zinc, silver, lead, and cobalt and heating the impregnated fabric to a temperature sufficient to activate the perchlorate and polymerize the polyepoxide.

2. The process for improving the crease resistance of a cellulosic textile fabric comprising impregnating the fabric with an aqueous solution containing a saturated polyepoxide which is a glycidyl polyether of glycerol and a catalytic amount of a perchlorate of a metal selected from the group consisting of magnesium, aluminum, cadmium, copper, manganese, zinc, silver, lead, and cobalt and heating the impregnated fabric to a temperature sufficient to activate the perchlorate and polymerize the polyepoxide.

3. In a process for curing polyepoxides, the improvement which comprises heating a saturated polyepoxide which is a polyglycide ether of a polyhydric alcohol in contact with a perchlorate of a metal selected from the group consisting of magnesium, aluminum, cadmium, copper, manganese, zinc, silver, lead, and cobalt to a temperature sufficient to active the catalytic activity of the perchlorate.

4. In a process for curing polyepoxides, the improvement which comprises heating a saturated polyepoxide which is a glycidyl polyether of glycerol in contact with a perchlorate of a metal selected from the group consisting of magnesium, aluminum, cadmium, copper, manganese, zinc, silver, lead, and cobalt to a temperature sufficient to activate the catalytic activity of the perchlorate.

References Cited in the file of this patent

UNITED STATES PATENTS 2,630,429   Hwa _____ Mar. 3, 1953

FOREIGN PATENTS 1,071,905   France _____ Mar. 10, 1954